April 14, 1936.  C. BANCROFT  2,037,450
ROTARY INTERNAL COMBUSTION ENGINE
Filed April 3, 1933  3 Sheets-Sheet 1
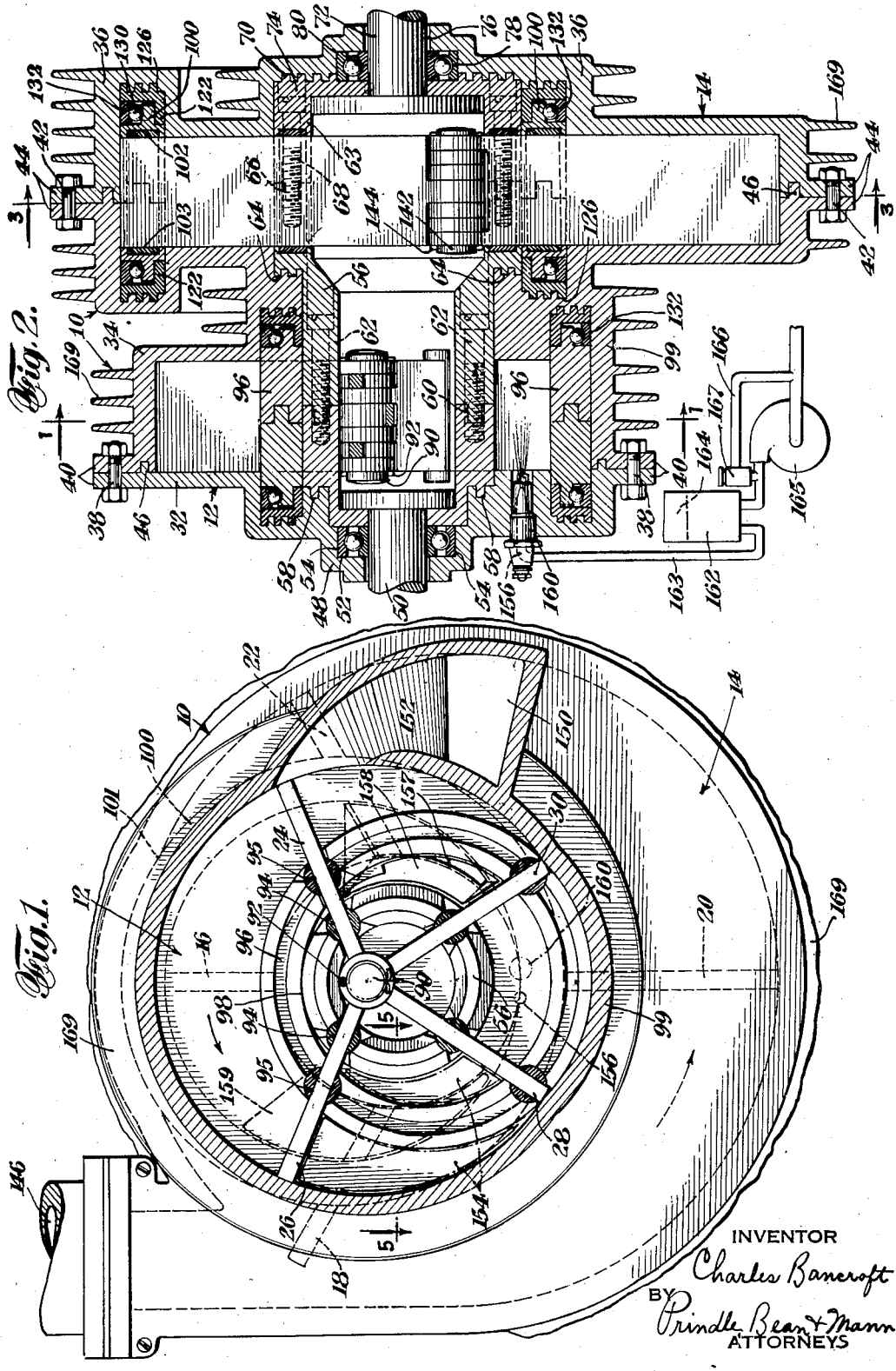
INVENTOR
Charles Bancroft
BY
Prindle Bean & Mann
ATTORNEYS April 14, 1936.  C. BANCROFT  2,037,450
ROTARY INTERNAL COMBUSTION ENGINE
Filed April 3, 1933   3 Sheets-Sheet 2
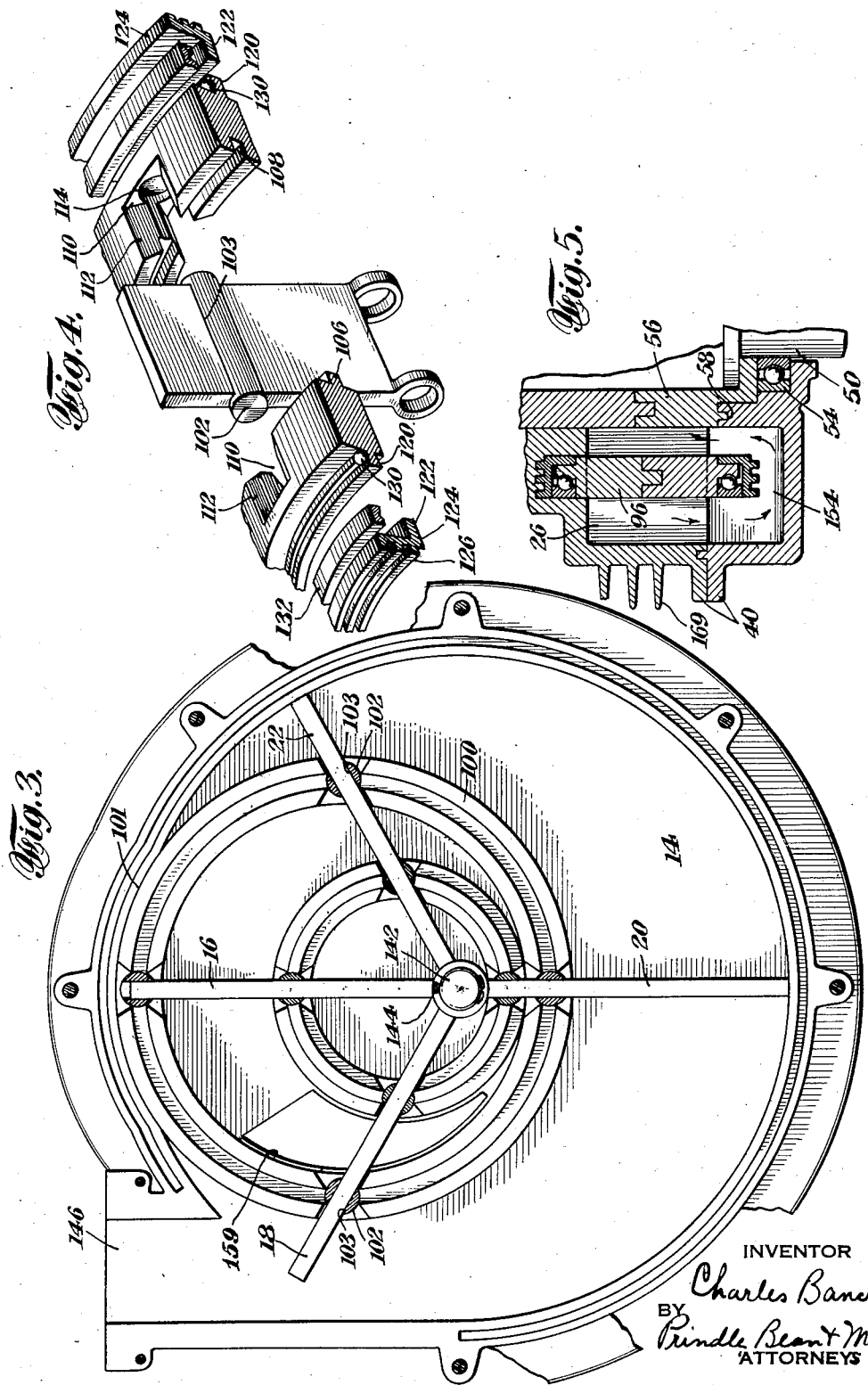

April 14, 1936.  C. BANCROFT  2,037,450
ROTARY INTERNAL COMBUSTION ENGINE
Filed April 3, 1933  3 Sheets-Sheet 3

INVENTOR
Charles Bancroft
BY
Prindle Bean + Mann
ATTORNEYS

Patented Apr. 14, 1936

2,037,450

UNITED STATES PATENT OFFICE 2,037,450

ROTARY INTERNAL COMBUSTION ENGINE

Charles Bancroft, New Canaan, Conn.

Application April 3, 1933, Serial No. 664,184

6 Claims. (Cl. 123—16)

This invention relates to a rotary internal combustion engine provided with a plurality of vanes which cooperate with the interior of the casing to provide a plurality of chambers, the chambers having a constant flow of gases through them and operating, respectively, under substantially constant pressures.

One object of this invention is the provision of a device having a large displacement per revolution as compared to its size and weight.

Another object of this invention is the provision of a device having a minimum of friction and having practically all its bearing surface carried on sleeve and ball bearings.

A further object of this invention is the provision of a device whereby each charge may be fired by a mixture with a positive minimum amount of previous fired charge, said minimum amount being controllably variable by design, thereby allowing positive ignition without usual complication and without wasteful expansion and dilution of the fresh charge by the old charge in so doing.

A further object of this invention is to provide a device which combines the advantages of carburetor and solid injection types of fuel supply and to prevent the disturbing effects of centrifugal force on the mixture previous to burning.

A further object of this invention is to provide a device in which substantially all moving parts may be suspended on ball or annular sleeve bearings and to eliminate substantially all sliding bearings.

Further objects of this invention include improvements in details of construction and arrangement whereby an efficient, simple and compact mechanism of this character is provided.

To the accomplishment of the foregoing and such other objects as may hereinafter appear, this invention comprises the construction, combination and arrangement of parts hereinafter described and then sought to be defined in the appended claims, reference being had to the accompanying drawings forming a part hereof, and which show merely for the purpose of illustrative disclosure, a preferred embodiment of my invention, it being expressly understood, however, that various changes may be made in practice within the scope of the claims without digressing from my inventive idea.

In the drawings:

Fig. 1 represents a vertical transverse cross section taken substantially on line 1—1 of Fig. 2.

Fig. 2 represents a vertical longitudinal cross section through the device showing the large section and the small section.

Fig. 3 represents a vertical transverse cross section taken substantially on line 3—3 of Fig. 2.

Fig. 4 represents an exploded view showing the construction between the sealing cylinder and the vane construction.

Fig. 5 represents a horizontal cross section taken substantially on line 5—5 of Fig. 1, and, Figs. 6 to 9 inclusive represent diagrammatic showings of the vanes in various positions and the ports.

Figure 7:
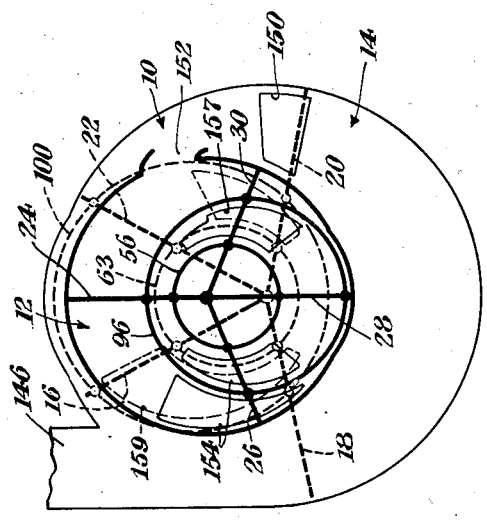
Figure 8:
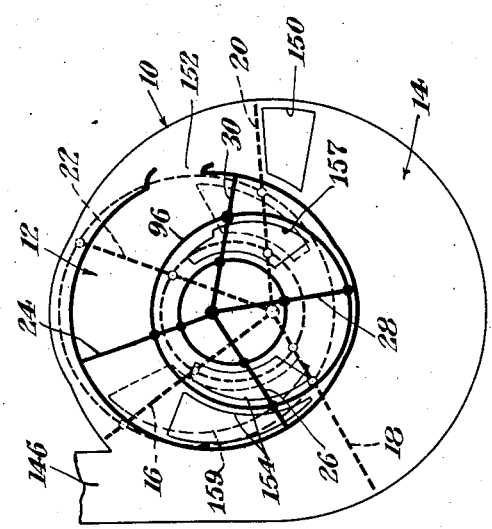
Figure 6:
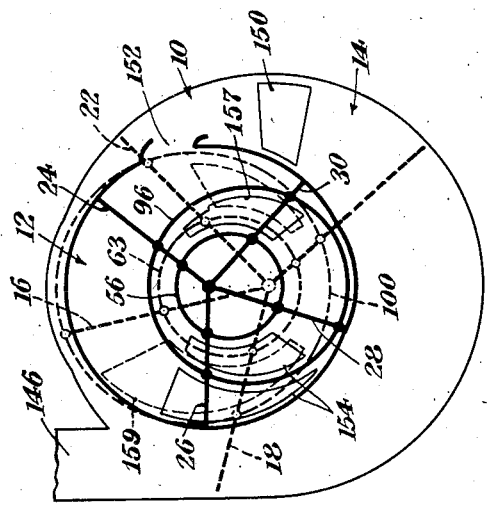
Figure 9:
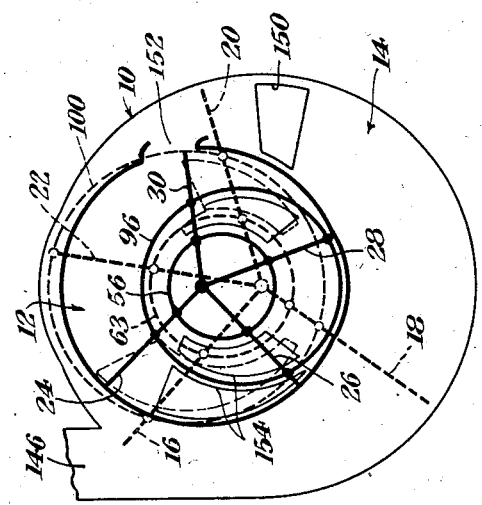

Referring now to the drawings, reference character 10 designates a casing or housing comprising small section 12 and large section 14 which form two chambers, each chamber receiving a set of vanes. The vanes in the larger section are numbered 16, 18, 20, and 22, and the vanes in the smaller section are numbered 24, 26, 28, and 30. The casing or housing 10 comprises end plate member 32, middle section 34, and end member 36, the end plate and middle section being connected by bolts 38 extending through the flanges 40 and the middle section and end section being connected by bolts 42 extending through the flanges 44. In order to provide a tight construction between the end plate and middle section and middle section and end section, the annular tongue and groove construction 46 is provided.

The end plate member 32 is provided with the raised portion 48 which is provided with an opening to receive shaft 50. A bearing-race 52 is provided between the shaft and the shoulder 54 on the end plate member. The shaft is provided with a hollow portion or drum 56 which is larger in diameter than the shaft 50 and is provided with the labyrinth construction 58 to form a sealing construction with the end plate member 32. The drum 56 is split at 60 in order to facilitate in the assembly of the device. The split sections are secured together by the screws 62. The drum 56 is positioned eccentrically within the small section 12 and has a larger portion 63 which extends into the large section 14. This large portion is also hollow and is provided at the inner end with the labyrinth construction 64 in the middle section 34 so as to provide a sealing construction. The larger shaft 63 is also split as at 66 in order to facilitate in the assembly of the device. The split portions of the shaft 63 are connected by means of screws 68. The right hand end of the shaft 63 in Fig. 2 is provided with the labyrinth construction 70 and is connected to solid shaft 72 by the integral flange 74.

Shaft 72 extends through opening 76 in the end member 36 and a ball-race 78 for the shaft 72 is provided in the shoulder 80 of the end member 36.

The vane construction and corresponding parts in the small chamber or section 12 will now be described. The inner ends of the vanes 24, 26, 28, and 30 are loosely or pivotally mounted on a pin 90 which is positioned in the center of section 12 and are held thereon by the cotter pins 92. It is to be noted that the vanes are not attached to the pin but are loosely mounted thereon. The vanes are of the same width as the chamber in small section 12 and extend through openings 94 and 95 in the hollow drum 56 and sleeve or cylinder 96 respectively. The cylinder 96 is eccentric to the section 12 and also to drum 56. The drum 56 and the cylinder 96 have extended contact as at 98 and so form a sealing construction. The section 12 at its lower end is formed with an arcuate bulged portion 99 with which the cylinder 96 has extended contact and this construction is adapted to form a seal and to carry off the heat to the outside walls. The cylinder 100 in large section 14 has extended contact at 101 with the section to also carry off the heat and also to provide a sealing construction. The cylindrical bearings 102 are provided for the vanes and have a slot 103 to receive a vane. The position of similarly positioned bearings in the cylinder 96 and drum 56 is such that the vanes passing through these bearings intersect at the pin 90. The position of pin 90 is determined by the following relationship. When the eccentricity of the drum 56 to the center of the small section 12 is to the eccentricity of the cylinder 96 to the center of the small section 12 as the radius of the drum 56 is to the radius of the cylinder, then the position of similarly positioned bearings in the drum and cylinder are such that the vanes passing through these bearings will intersect at the center of small section 12, thereby fixing the position of pin 90 at that point. The respective bearings in the drum and cylinder will be in alinement with the center of the casing or pin 90 at all times. For the eccentricities shown in the drawings the vanes and bearing represent such correct positioning. This construction is an important feature of my invention as it permits maintaining the pin in a certain position without attaching the pin 90 mechanically to the device.

The cylinder 100 and its corresponding parts will now be described in detail in connection with Fig. 4. The cylinder 100 is made of two parts so as to facilitate the construction and assembly of the device. The two parts are provided with the notch 106 and the groove 108 for forming a tight fit. The cylinder is formed with the cut-away portions 110 and the tapering sides 112 to receive the vane and bearing member 102 and to permit movement of the vanes during rotation thereof. The sleeve is provided with the circular depression 114 to receive the end of the cylindrical bearing member 102. The outer ends of the cylinder 100 are provided with the shoulders 120 which cooperate with the flange 122 on sealing ring 124. The sealing rings 124 are provided with the labyrinth construction 126 in the middle section 34 to prevent the escape of gases from the device. Positioned on the shoulder 120 are the ball bearings 130 which cooperate with and are held in position by the ring 132. It is to be understood that the cylinder 96 and its corresponding parts for the small section 12 of the device is similar in construction to the cylinder 100 just described and it is believed unnecessary to repeat the description in connection with cylinder 96.

The vanes 16, 18, 20, and 22 of the large section 14 are loosely mounted on a pin 142 and are held thereon by cotter pins 144. This construction is the same as the one described in the small section and the position of pin 142 is determined by the eccentric relationships of the drum and cylinder to the section 14 as above described in connection with the vanes for the small section. The vanes in the two sections are so arranged as to perform the operations of the device.

An air inlet 146 is provided for the large section and the vanes 16, 18, 20, and 22 in the large section by their rotation draw in air into the large section. It is to be understood however, that a carburetor may be used and a mixture of fuel and air drawn in instead of air only. The passage of gases through the device will now be generally described. From the large section 14 the air moves through port 150 and through the passage 152 to the small section 12 where it is initially compressed. The air is then conducted through and around the small section 12 between the inner wall of the section 12 and the outer face of cylinder 96. The air is then compressed and is conducted through the passage 154 into the space between the outer face of drum 56 and the inner face of cylinder 96, the passage being shown in detail in Fig. 5. When the air in the chamber between the vanes in the smaller section is about at maximum compression approximately as shown in Fig. 1, fuel under substantially constant pressure is injected through nozzle 156. Vane 30 then opens port 152 to the compressed gases in the chamber between vanes 30 and 22 in Fig. 1, allowing the mixing of burnt gases trapped in passage 158 with the compressed gases and thereby firing the compressed gases. This passage 158 leads from the small section 12 to the large section 14, and the burning gas exerts a pressure on a large vane substantially in the position shown by vane 16 in Fig. 1. The vane 16 is then moved in a counter-clockwise direction under this pressure until it uncovers exhaust port 159. In initial starting of the operation of the device, it is necessary to use a spark plug 160 after which the trapped burnt gases in passage 158 ignite the compressed charge as described above. At positions of high pressure such as occur between vane 28 and vane 30 it will be observed that the vanes are supported by the spaced bearings at the outer end and center of the vanes. The contact of the bearings assists in dissipating the heat from the vanes. In other positions it will be seen that the bearings have assumed different positions so that the bearings function to scrape the vanes during each rotation and tend to keep them cool. The working chambers as seen in Fig. 2 of the drawings are of such shape as to have a maximum volume for a minimum area of containing wall thereby reducing to a minimum the amount of power loss due to heat radiation. In the large section the bearings are so positioned as to afford a substantial support for the vanes as discussed in connection with the compression chamber of the small section.

Fuel may be injected continuously with proper rates of flow. For delivering fuel under a substantially constant pressure the following construction is provided. The nozzle 156 is connected to a tank 162 by tube 163. The tank is closed at its upper end and has trapped therein a quantity of air 164 which acts as a pressure equalizer. For producing the pressure a pump 165 is provided having a by-pass 166 and a pressure regulator 167 in said by-pass so as to maintain the pressure substantially constant. If desired, means for periodically injecting fuel such as a Bosch pump may be used for injecting fuel at the proper intervals. Any common type of fuel may be used without change of structure or parts.

The casing of the device is provided with the fins 169 to dissipate the heat from the casing. It is to be understood however, that water cooling may be employed.

In determining the opening between the intake portion of the large section and the inner chamber of small section 12, the passage limits are marked by the vane in the large section 14 when the drum is substantially in the position shown in Fig. 7 and in the small section when the vanes are in the position shown in Fig. 1. The passage limits of the opening between the chamber formed by the small section 12 and the outer face of cylinder 96 and the chamber formed between the outer face of drum 56 and the inner face of cylinder 96 are marked by the vane when the vanes 26 and 28 in the small section are in the position shown in Fig. 1. The passage limits from the firing chamber in small section 12 to the working chamber in large section 14 is marked in the small section when the small vanes are in the position shown substantially in Fig. 1 and by the vanes in the large section 14 when the vanes 16 and 20 are in the vertical position shown in Fig. 1.

The operation of the device is as follows. At the beginning of the operation it is necessary to rotate the shafts 50 and 72 and the vanes in the two sections 12 and 14. Rotation of the large vanes 16, 18, 20, and 22 draws air into large section 14 through inlet 146. The air ahead of vane 20 is drawn through port 150 and passage 152 into the chamber in small section 12 between the outer face of cylinder 96 and inner wall of small section 12 and by movement of vane 24 and is initially compressed. Vane 24 moves until it assumes the position of vane 26 just before port and passage 154. Further rotation of vane 26 opens the port and permits air to pass around cylinder 96 (Figs. 1 and 5) and into the chamber formed between the inner face of cylinder 96 and outer face of drum 56. When the vanes assume approximately the position shown by vanes 28 and 30 in Fig. 1, a charge of fuel such as fuel oil, kerosene, hydrocarbon mixtures and the like, under constant pressure, is injected through nozzle 156 and the spark plug 160 is energized to ignite the mixture therebetween. The vanes further rotate until vane 30 uncovers port 157 and passage 158 and the burning gases enter large section 14 and force large vane 22 in a counter-clockwise direction. The expanding mixture forces the large vane in the position of vane 16 to the left until exhaust port 159 is opened and the burned gas is exhausted. It is to be noted that there are four working strokes for each cycle. When the device has been started it is not necessary to use the spark plug 160. There will always be a residual amount of hot combustion gases in connecting passage 158 which will ignite the fresh mixture.

While the device has been described particularly in connection with a combustion engine it is to be expressly understood that I am entitled to all uses to which my device can be put, such as a multi-stage pump or compressor.

From the foregoing description it will be apparent that I have provided a device having a very large power output for a given weight and size of motor and also provision is made for drawing in large volumes of air. Furthermore, it will be seen that all working bearing pressures of any extent are carried on efficient anti-friction bearings, such as, ball bearings and sleeve bearings of small diameter as shown in the drawings.

What I claim is:

1. A device of the character described, including, a casing formed with a plurality of substantially cylindrical sections, said casing having an inlet and an exhaust, a shaft provided with a hollow drum extending into said sections and mounted eccentrically to the centers of said sections, hollow cylinders in said sections surrounding said drum and mounted eccentrically to the center of each respective section and the center of said drum, a plurality of vanes in each of said sections fixed and supported in position by similarly positioned bearings in the cylindrical surfaces of said drum and cylinders, said vanes in each section being joined pivotally together at one end, these pivotal bearings being inside said hollow drum and maintained in a position coinciding with center of each section by proper choice of the relative eccentricities of said drum and cylinders and consequent alinement of respective vane bearings in the surfaces of said drum and cylinders with the center of said sections, said vanes in the respective sections cooperating with the casing, the cylinders, and the drum to form a plurality of chambers, and form means for drawing in gases through said inlet and compressing the gases in certain of said chambers, ports affording communication into and between said chambers, and means for injecting and igniting fuel approximately at the point of greatest compression of gases, the expanding gases being adapted to exert a force on certain of said vanes and cause rotation of said shaft and then being conducted to said exhaust.

2. A device of the character described including, a cylindrical casing formed with a plurality of sections, said casing having an inlet and an exhaust, a shaft having a hollow drum extending into said sections and mounted eccentrically to the centers of said sections, hollow cylinders surrounding said drum and mounted eccentrically to the centers of said sections and to the center of said drum, large ring bearings for said cylinders, a plurality of vanes in each of said sections fixed and supported in position by similarly positioned bearings in the cylindrical surfaces of said drum and cylinders, said vanes in each section being joined pivotally together at one end, these pivotal bearings being inside said hollow drum and maintained in a position coinciding in each section with the center thereof by proper choice of the relative eccentricities of said drum and cylinders and consequent alinement of respective vane bearings in the surfaces of said drum and cylinders with the center of said sections, said vanes in the respective sections cooperating with said casing, the cylinders and the drum, to form a plurality of chambers and forming means for drawing in gas through said inlet and compressing the gas in certain of the chambers, ports affording communication into and between the chambers, means for injecting and initially igniting fuel approximately at the point of greatest compression of gas, and means whereby each fresh charge is fired by mixture with a small amount of previous burnt charge, the expanding combustion gases being adapted to exert a pressure on certain of said vanes before being conducted to said exhaust.

3. A device of the character described, including, in combination, a casing having a large cylindrical section and a small cylindrical section, a plurality of vanes in each section a hollow drum and a hollow cylinder in each section, said vanes, drums, cylinders and casing forming a plurality of chambers, said casing having an inlet and an exhaust, said vanes in said one large section being adapted to draw in gas through said inlet and between said cylinder and casing in said section, said casing being provided with a passage from said large section to said small section to conduct gas thereto and compress the gas between said cylinder, vanes and drum in said small section, means for injecting fuel at the approximate maximum compression and igniting the mixture, said casing being provided with another passage for leading the combustion gases to said large section between the drum and cylinder in said section so that the expanding gases exert a force on the vanes therein and cause rotation thereof and thereafter are conducted to said exhaust.

4. A device of the character described, including, in combination, a casing provided with an inlet and exhaust and having cylindrical sections of different size, a shaft extending through said casing and having a hollow drum mounted eccentrically to the center of one section and another drum eccentrically mounted to the center of the other section, a hollow cylinder in each section surrounding said drums and mounted eccentrically to the center of each section respectively and to each drum respectively, a plurality of vanes in each section, bearings in said cylinders and drums for said vanes, said vanes in each section being pivotally joined together at their inner ends within said drums and being maintained in a position coinciding respectively with the center of the sections of the casing, said device being provided with passages, said vanes, cylinders, drums and sections forming chambers for drawing in air through said inlet and between the cylinder, casing, and vanes in the large section, for passing the air through the small section and compressing the air between the vanes, drum and cylinder therein, means for adding fuel and igniting the mixture while the air is compressed, then passing the combustion gases to the large section through a passage and between the drum and cylinder therein and then exhausting the combustion gases through said exhaust.

5. A device of the character described, including, in combination, a casing having a large cylindrical section and a small cylindrical section, a plurality of vanes in each section, a hollow drum and a hollow cylinder in each section, said vanes, drum, cylinder and casing forming a plurality of chambers, said casing having an inlet and an exhaust, said vanes in said large section being adapted to draw in air through said inlet and between said cylinder and casing in said section, said casing being provided with a passage from said large section to said small section to conduct air thereto and compress the air between said cylinder, vanes and drum in said section, means for injecting fuel at the approximate maximum compression, means whereby each fresh charge is ignited by a small amount of previous burned charge, said casing being provided with another passage for leading the combustion gases to said large section between the drum and cylinder in said section so that the expanding gases exert a force on the vanes therein and cause rotation thereof and thereafter are conducted to the exhaust.

6. A device of the character described, including, in combination, a casing provided with an inlet and exhaust and having cylindrical sections of different size, a shaft extending through said casing and having a hollow drum mounted eccentrically to the center of one section and another drum eccentrically mounted to the center of the other section, a hollow cylinder in each section surrounding said drums and mounted eccentrically to the center of each casing respectively and to each drum respectively, a plurality of vanes in each section, bearings in said cylinders and drums for said vanes, said vanes in each section being pivotally joined together at their inner ends within said drums and being maintained in a position coinciding respectively with the center of the sections of the casing, said device being provided with passages, said vanes, cylinders, drums and sections forming chambers for drawing in air through said inlet and between the cylinder, casing and vanes in the large section, for passing the air through the small section and compressing the air between the vanes, drum and cylinder therein, means for adding fuel to the mixture while the air is compressed, means whereby the charge is fired by a residual amount of hot combustion gases from the previous charge, then passing the combustion gases to the large section through a passage and between the drum and cylinder therein and thereafter passing the combustion gases to said exhaust.

CHARLES BANCROFT.